US008170553B2

(12) United States Patent
Bennett

(10) Patent No.: US 8,170,553 B2
(45) Date of Patent: May 1, 2012

(54) CASH CARD SYSTEM INTERFACE MODULE

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 941 days.

(21) Appl. No.: 12/182,530

(22) Filed: Jul. 30, 2008

(65) Prior Publication Data

US 2009/0305672 A1 Dec. 10, 2009

Related U.S. Application Data

(60) Provisional application No. 61/058,782, filed on Jun. 4, 2008.

(51) Int. Cl.
*H04W 4/00* (2009.01)
(52) U.S. Cl. ............... 455/435.2; 455/432.1; 455/435.1; 370/338
(58) Field of Classification Search ............... 455/435.2, 455/432.1, 435.1, 445; 370/338
See application file for complete search history.

(56) References Cited

U.S. PATENT DOCUMENTS

| 5,881,050 | A | * | 3/1999 | Chevalier et al. | ............. | 370/230 |
| 5,987,325 | A | * | 11/1999 | Tayloe | ........................ | 455/435.2 |
| 7,020,438 | B2 | * | 3/2006 | Sinivaara et al. | ............ | 455/41.2 |
| 7,020,439 | B2 | * | 3/2006 | Sinivaara et al. | ............ | 455/41.2 |
| 7,277,703 | B2 | * | 10/2007 | Saglam et al. | ................ | 455/434 |
| 7,689,216 | B2 | * | 3/2010 | Wandel | ......................... | 455/434 |
| 7,693,515 | B2 | * | 4/2010 | Kishida et al. | ............. | 455/435.1 |
| 7,835,743 | B2 | * | 11/2010 | Zhang et al. | .................. | 455/436 |
| 8,027,677 | B2 | * | 9/2011 | Carpenter | .................. | 455/435.2 |
| 2003/0003910 | A1 | * | 1/2003 | McClure | ........................ | 455/435 |
| 2004/0092259 | A1 | * | 5/2004 | Blanc et al. | ................ | 455/432.1 |
| 2004/0202141 | A1 | * | 10/2004 | Sinivaara et al. | ............. | 370/338 |
| 2006/0003764 | A1 | * | 1/2006 | Saglam et al. | ............. | 455/432.1 |
| 2006/0094427 | A1 | * | 5/2006 | Buckley et al. | ............... | 455/434 |
| 2006/0114870 | A1 | * | 6/2006 | Buckley et al. | ............... | 370/338 |
| 2008/0090614 | A1 | * | 4/2008 | Sicher et al. | .................. | 455/558 |
| 2008/0182615 | A1 | * | 7/2008 | Xue et al. | .................... | 455/552.1 |
| 2008/0261603 | A1 | * | 10/2008 | Sever et al. | .................... | 455/445 |
| 2009/0117939 | A1 | * | 5/2009 | Asthoff | ....................... | 455/552.1 |
| 2009/0287589 | A1 | * | 11/2009 | Fivel | .............................. | 705/28 |
| 2010/0144348 | A1 | * | 6/2010 | Wandel | ......................... | 455/434 |
| 2010/0216465 | A1 | * | 8/2010 | Mubarek et al. | ........... | 455/435.1 |
| 2010/0311402 | A1 | * | 12/2010 | Srinivasan et al. | ............ | 455/418 |
| 2010/0311444 | A1 | * | 12/2010 | Shi et al. | ........................ | 455/466 |
| 2010/0311468 | A1 | * | 12/2010 | Shi et al. | ........................ | 455/558 |
| 2011/0059738 | A1 | * | 3/2011 | Waller | ........................... | 455/433 |

* cited by examiner

*Primary Examiner* — Minh D Dao
(74) *Attorney, Agent, or Firm* — Garlick & Markison

(57) ABSTRACT

A wireless device, for each of a plurality of wireless networks, establishes communications with each wireless network and transmits SIM card information to the wireless network. The plurality of wireless networks transmit SIM card authentication information requests to a cash card SIM server computer and, if a service agreement exists with an operator of the cash card SIM server, receives SIM card authentication challenge information. At least two of the wireless networks then authenticate the wireless device and prepare and transmit wireless service terms to the wireless device. The wireless device selects a servicing wireless network from the at least two wireless networks based upon the corresponding received wireless service terms and receives wireless service from the selected wireless network. The wireless network and cash card SIM server coordinate billing for such service and deduct appropriate amount(s) from the account of the SIM card.

21 Claims, 8 Drawing Sheets

CASH CARD SYSTEM INTERFACE MODULE

CROSS REFERENCES TO PRIORITY APPLICATIONS

This application claims priority under 35 U.S.C. 119(e) to U.S. Provisional Application Ser. No. 61/058,782, filed Jun. 4, 2008, and having a common title with the present application, which is incorporated herein by reference in its entirety for all purposes.

BACKGROUND

1. Technical Field of the Invention

This invention relates generally to wireless communications, and more particularly to subscriber based wireless voice and data services.

2. Related Art

Wireless communications are well known in the art. Wireless communications include Wireless Local Area Network (WLAN) communications, Wireless Wide Area Network (WWAN) communications, Wireless Personal Area Network (WPAN) communications, and cellular communications, among other wireless communications. Cellular communication systems are well known to include one or more cellular wireless networks, each of which supports cellular wireless communications with cellular telephones (wireless devices). Cellular wireless networks typically support one or more cellular communication operating standards such as the Global Standards for Mobile communication (GSM) standards, the North American Code Division Multiple Access (CDMA) communication standards, the North American Time Division Multiple Access (TDMA) communication standards, the GSM Packet Radio System (GPRS) standards, the Enhanced Data for GSM Evolution (EDGE) standards, the 1xEV-DO standards, the 1xEV-DV standards, and the Universal Mobile Telecommunications System (UMTS) standards, among others.

With cellular communications, a user of a cellular telephone (wireless device) typically contracts with a particular wireless network service provider, "contracted service provider" for cellular wireless network access and usage under a respective service plan. With one example of such an arrangement, a user of a cellular telephone contracts with an operator of a cellular wireless network within North America, e.g., the United States. With this example, the contracted service provider has a GSM cellular wireless network infrastructure (or is contracted with one) that provides wireless service within at least a portion of the United States and has roaming agreements with differing service providers within the United States, with service providers of differing countries, e.g., Canada, Mexico, and/or with service providers of differing continents, e.g., Europe, Asia, etc. With this structure/schema, the user of the cellular telephone receives cellular service not only from the contracted cellular service provider but from cellular service providers having roaming agreements with the contracted service provider.

When a subscriber contracts for service with his/her contracted service provider, the user is issued a System Interface Module (SIM) card, which is installed within the subscriber's cellular telephone. The contract for service may be on a periodic basis, month-to-month, or for a differing period of time. The SIM card includes information regarding the contracted service provider, information that identifies the subscriber, and information that allows a cellular wireless network to authenticate the SIM card. Prior to providing wireless service to a cellular telephone, a servicing cellular wireless network receives information from the SIM card and authenticates the SIM card/cellular telephone using such information and additional information retrieved from a differing device, e.g., contracted service provider's server computer.

Only if the cellular telephone having the SIM card is operating within the cellular wireless network service coverage area of the contracted service provider or operating within a service coverage area of a cellular wireless network of a service provider that has a roaming agreement with the contracted service provider, will the cellular telephone be able to receive service. It is not uncommon for the coverage areas of a number of cellular wireless networks to overlay one another. Further, it is not uncommon for a cellular telephone to support two or more cellular interface standards. Thus, in many operations, a cellular telephone is not able to access available cellular wireless networks solely due to lack of/limitations in roaming agreements between the contracted service provider and an operator of an available cellular wireless network. The problem with accessing cellular wireless networks of other service providers is acute in geographical areas where many differing cellular wireless networks exist within a relatively small geographic area and/or while the cellular telephone is far from its home location area. In Europe, for example, a particular subscriber may have a very limited area in which he or she may access cellular wireless network service due to lack of roaming agreements between the contracted service provider and other cellular wireless networks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
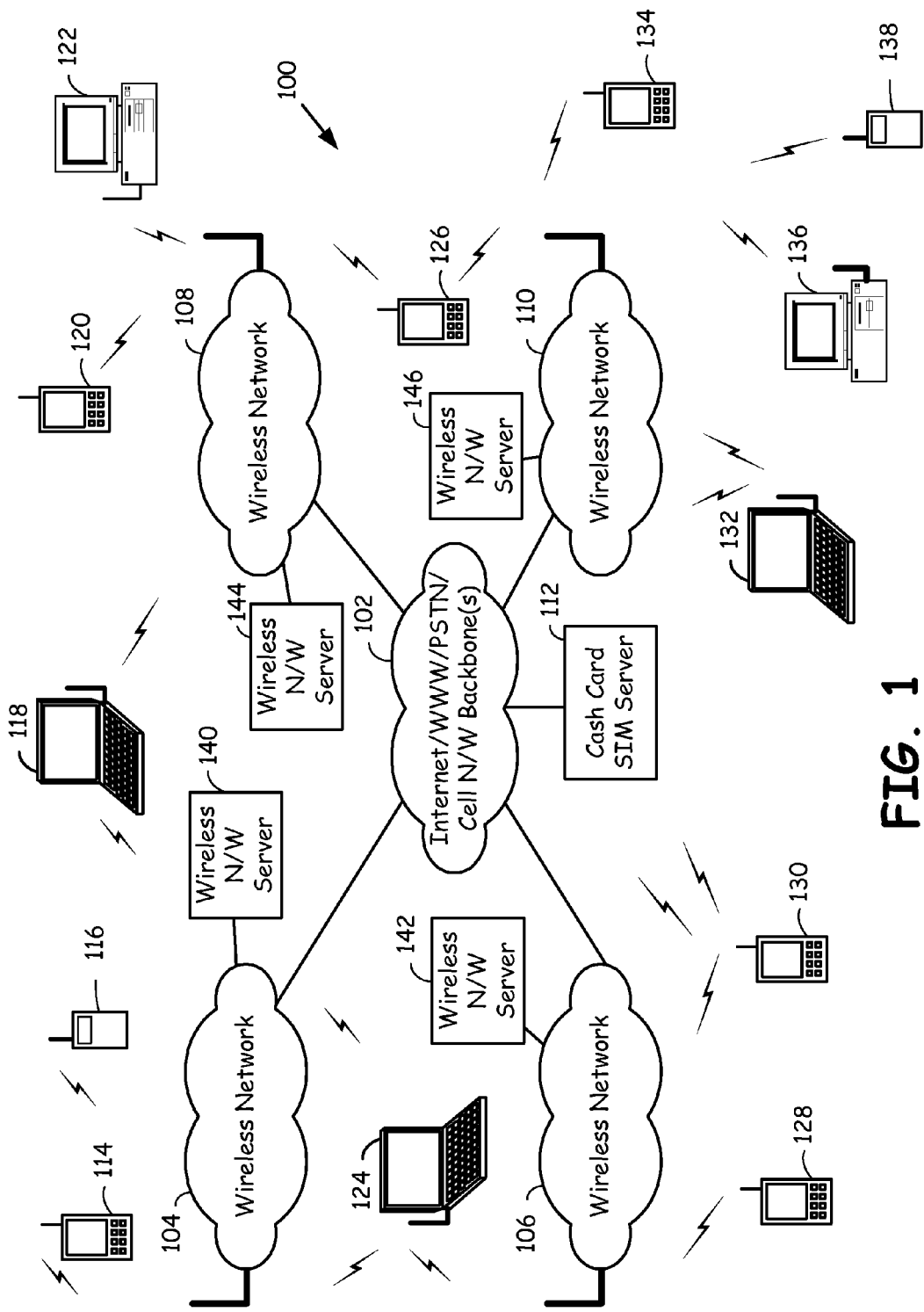
FIG. 1 is a system diagram illustrating a plurality of wireless networks and interconnecting networks that operate according to one or more embodiments of the present invention.

FIG. 1 is a system diagram illustrating a plurality of wireless networks and interconnecting networks that operate according to one or more embodiments of the present invention. The system 100 includes a plurality of wireless networks 104, 106, 108, and 110. According to one embodiment of the system 100 of FIG. 1, each of wireless networks 104, 106, 108, and 110 is a cellular network. Further, in other embodiments of the system 100 of FIG. 1, wireless networks 104, 106, 108, and 110 may be Wireless Local Area Networks (WLAN), wireless wide area networks (WWANs), and/or a combination of these types of networks and cellular networks. When the wireless networks 104, 106, 108, and 110 are cellular networks, each of the wireless networks 104-110 supports one or more cellular network operating standards. Generally, wireless networks described herein will be described as cellular wireless networks, even though principles of the present invention apply to differing types of networks as well.

The wireless networks 104, 106, 108, and 110 intercouple via one or more intercoupling networks 102. These intercoupling networks 102 may include the Internet, the World-Wide Web, one or more PSTN backbones, and/or one or more cellular network backbone networks. In combination, the wireless networks 104, 106, 108, and 110 service wireless devices 114, 116, 118, 120, 122, 124, 126, 128, 130, 132, 134, 136, and 138. The wireless devices 114-138 may be cellular handsets, handheld data terminals, wirelessly enabled laptop computers, wirelessly enabled desktop computers, and/or any other type of wireless device that wirelessly communicate with one or more of wireless networks 104, 106, 108, and/or 110.

Each of the wireless networks 104-110 includes a wireless network infrastructure. Further, each of the wireless networks 104-110 may include one or more wireless network servers. For example, wireless network 104 includes wireless network server 140, wireless network 106 includes wireless network server 142, wireless network 108 includes wireless network server 114, and wireless network 110 includes wireless network server 146. These wireless network servers 140-146 provide wireless network support services for wireless networks 104-110, respectively. The structure and operation of the wireless networks 104-110 and their respective wireless network servers 140-146 will not be described further herein except as how they relate to the operations of the present invention. However, generally, the wireless network servers 140-146 provide home location network services, authentication services, billing services, registration services, messaging services, call processing services, maintenance services, and a number of other services. These wireless network servers 140-146 may be referred to using different names in various embodiments.

Further illustrated in FIG. 1 of the system 100 is cash card System Interface Module (SIM) server 112. Generally, cash card SIM server 112 supports the operations of one or more wireless devices 114-138 so that the wireless devices may be serviced by any of the wireless networks 104-110 even though the wireless devices are not supported via subscriber agreements or roaming agreements by such wireless networks 104-110. Generally, an operator of cash card SIM server 112 issues a SIM card to one or more wireless devices 114-138. The SIM cards are linked to cash card SIM server 112. In combination, the SIM cards and the cash card SIM server 112 enable the wireless devices 114-138 to receive service from the wireless networks 104-110, even though the wireless networks 104-110 are not operated by a contracted service provider of the wireless devices 114-138 or and/or are not operated by a service provider having a roaming agreement with the contracted service provider.

In one particular embodiment, when attempting to obtain wireless service, wireless device 124 attempts to access each of the plurality of wireless networks 104-110. However, the wireless networks 104-110 are not operated by the contracted service provider and/or are not operated by an operator having a roaming agreement with the contracted service provider. Thus, according to the present invention, one or more of the wireless networks 104-110 interacts with the wireless device 124 and, based upon the interaction with wireless device, interacts with cash card SIM server 112 to determine whether or not to provide wireless service to wireless device 124.

Generally, a SIM card of the wireless device 124 is issued by an operator of the cash card SIM server 112. The operator of cash card SIM server then establishes a relationship with one or more of the operators of the wireless networks 104-110. These agreements are not roaming agreements but are agreements for a servicing wireless network to receive compensation for providing service to wireless devices on a usage agreement.

If one or more of the wireless networks 104-110 determines that an agreement exists between a particular wireless network operator and an operator of the cash card SIM server 112, wireless service may be provided to wireless device 124. Further, in order to be compensated for providing the wireless service, a servicing wireless network, e.g., wireless network 104, interacts with cash card SIM server 112 so that the operator of wireless network 104 will be paid for the service provided. Particular examples of the operation of the system 100 are described herein with reference to FIGS. 2, 3, 6, 7, and 8. The structure of a wireless device that supports operations of the present invention will be further described herein with reference to FIG. 4. The structure of a cash card SIM server 112 that supports operations of the present invention will be further described herein with reference to FIG. 5.

Figure 2:
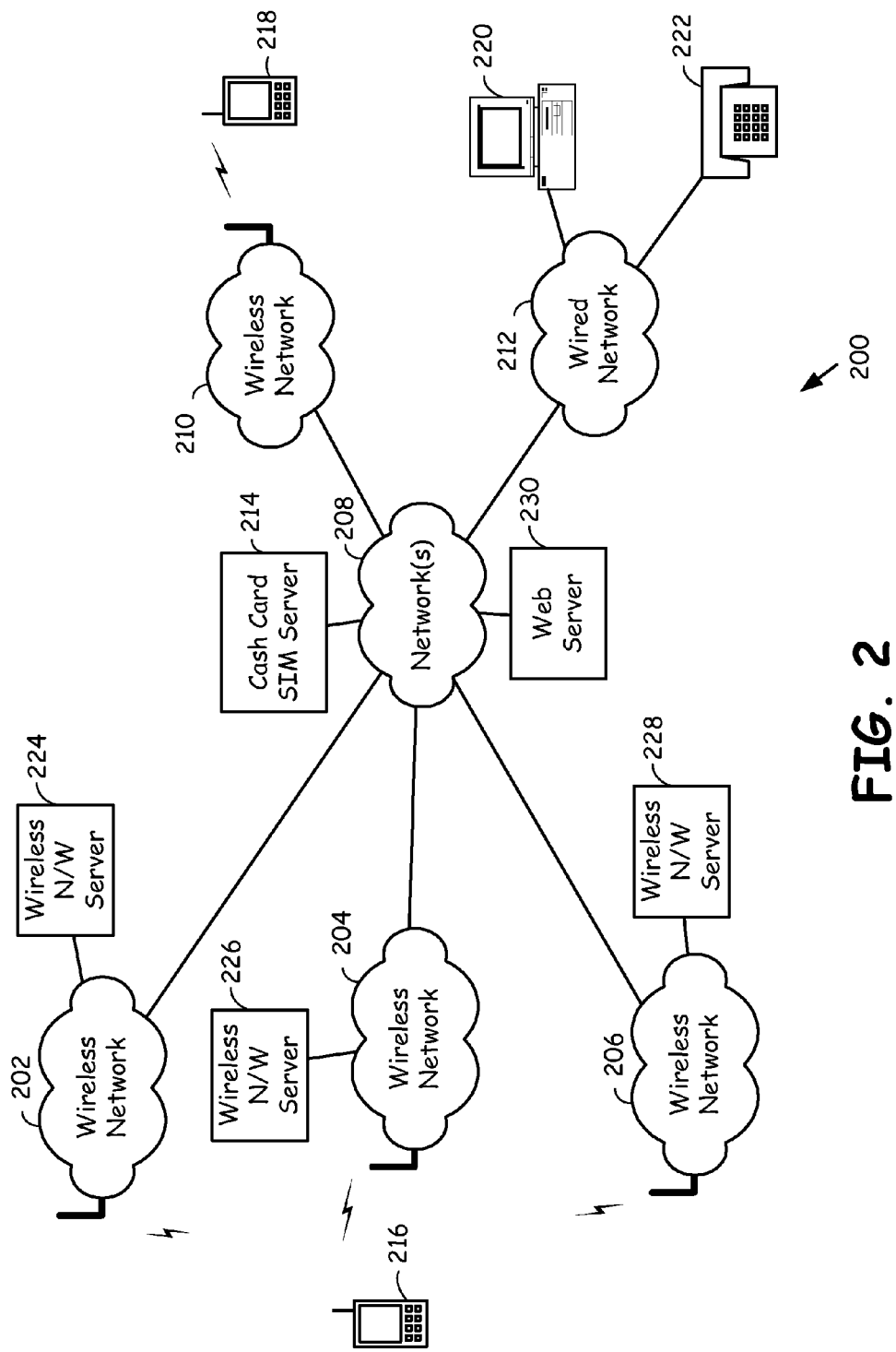
FIG. 2 is another system diagram illustrating a plurality of wireless networks and interconnecting networks that support one or more embodiments of the present invention.

FIG. 2 is another system diagram illustrating a plurality of wireless networks and interconnecting networks that support one or more embodiments of the present invention. The system 200 of FIG. 2 includes wireless networks 202, 204, 206, and 210. Further, the system 200 includes wired network 212 and one or more interconnecting network(s) 208. Each of wireless networks 202, 204, and 206 includes respective wireless network servers 224, 226, and 228, respectively. Each of wireless networks 202, 204, and/or 206 operates according to one or more cellular interface standard and potentially provides service to wireless device 218.

Wireless device 218 wirelessly communicates with wireless network 210. Wireless network 210 may be a cellular network, a WPAN, a WLAN, and/or a WWAN. Wired network 212 may be a Local Area Network (LAN), a Wide Area Network (WAN), the Internet, the Worldwide Web, or another wired network that provides service to wired devices 220 and 222. As illustrated, wired device 220 is a desktop computer while wired device 222 is a telephone, each of which couples to wired network 212 and receives service there from. Web server 230 couples to network(s) 208 as does cash card SIM server 214. When the wireless device 218 receives service from one or more of wireless networks 202, 204, and/or 206, it may communicate with one or more of wireless device 218 and wired devices 220 and 222.

According to a first operation of the present invention, wireless device 216 desires to receive wireless service from one of wireless networks 202, 204, or 206. Thus, upon an initiation of service, e.g., startup or reset, wireless device 216 attempts to establish communication with each of wireless networks 202, 204, and 206. In attempting to establish service, wireless device 216 wirelessly requests service from each of the wireless networks 202, 204, and 206. The wireless networks 202, 204, and 206 then wireles sly interact with wireless device 216 to receive SIM card information from the wireless device 216. The SIM card information includes an identity of a cash card SIM computer 214. The identity of the cash card SIM computer may be a Uniform Resource Locator (URL) identifier of the case card SIM computer 214 or a network address of the cash card SIM server 214, for example. Each of the wireless networks 202, 204, 206 transmits a SIM card authentication information request to the cash card SIM server computer 214 via network infrastructure and network(s) 208. The cash card SIM computer then determines whether a service agreement exists between an operator of the cash card SIM computer 214 and one or more of the wireless networks 202, 204, and 206. With the system 200 of FIG. 2, a service agreement may exist between the operators of each of wireless networks 202, 204, and 206 and the operator of cash card SIM server 214. In such case, the cash card SIM server 214 then sends SIM card authentication information to each of wireless networks 202, 204, and 206. The SIM card information may include SIM card authentication challenge information.

Upon receipt of the SIM card authentication challenge information, each of wireless networks 202, 204, and 206 will, at differing times, transmit a SIM card challenge to the wireless device 216 based upon the information. Wireless device 216 receives the SIM card challenge and respectively responds to one or more of wireless networks 202, 204, and 206. Each of wireless networks 202, 204, and 206 then receives the SIM card challenge response from the wireless device 216. Then, each of the wireless networks 202, 204, and 206 determines whether the SIM card challenge response received from wireless device 216 is authentic. Depending upon whether the SIM card challenge response(s) received from wireless device 216 is/are authentic, one (or more of) wireless networks 202, 204, and 206 provides wireless service terms to the wireless device 216. The wireless service terms provided by each of wireless networks 202, 204, and 206 are respective to the wireless networks 202-206.

Then, based upon interaction with a user of wireless device 216, in some embodiments, the wireless device selects a servicing wireless network from the wireless networks 202, 204, and 206. With the example of system 200 of FIG. 2, wireless device 216 receives favorable service terms from wireless network 204 and selects to receive service from wireless network 204. Then, the wireless device 216 receives wireless service from wireless network 204. The wireless device 216 receives service from wireless network 204 for a period of time (e.g., while credit still exists with SIM card) or until such service is terminated. Resultantly, the wireless network 204, in response to providing the wireless service, creates a usage data record regarding the wireless service provided to the wireless device 216. This usage data may be a billing record that includes the identity of the SIM card of wireless device 216. Wireless network 204 then transmits the usage data to the cash card SIM computer. The cash card SIM computer 214 receives the usage data regarding the SIM card and accounts for the usage data regarding the SIM card. In a typical transaction, the cash card SIM server 214 will deduct a first amount from the account balance of the SIM card corresponding to wireless device 216 based upon the usage data. Then, the cash card SIM server 214 would also credit a second amount to the servicing wireless network 204 based upon the usage data. In a typical operation, the second amount would be less than the first amount so that the operator of cash card SIM computer 214 would make a profit upon the transaction.

Figure 3:
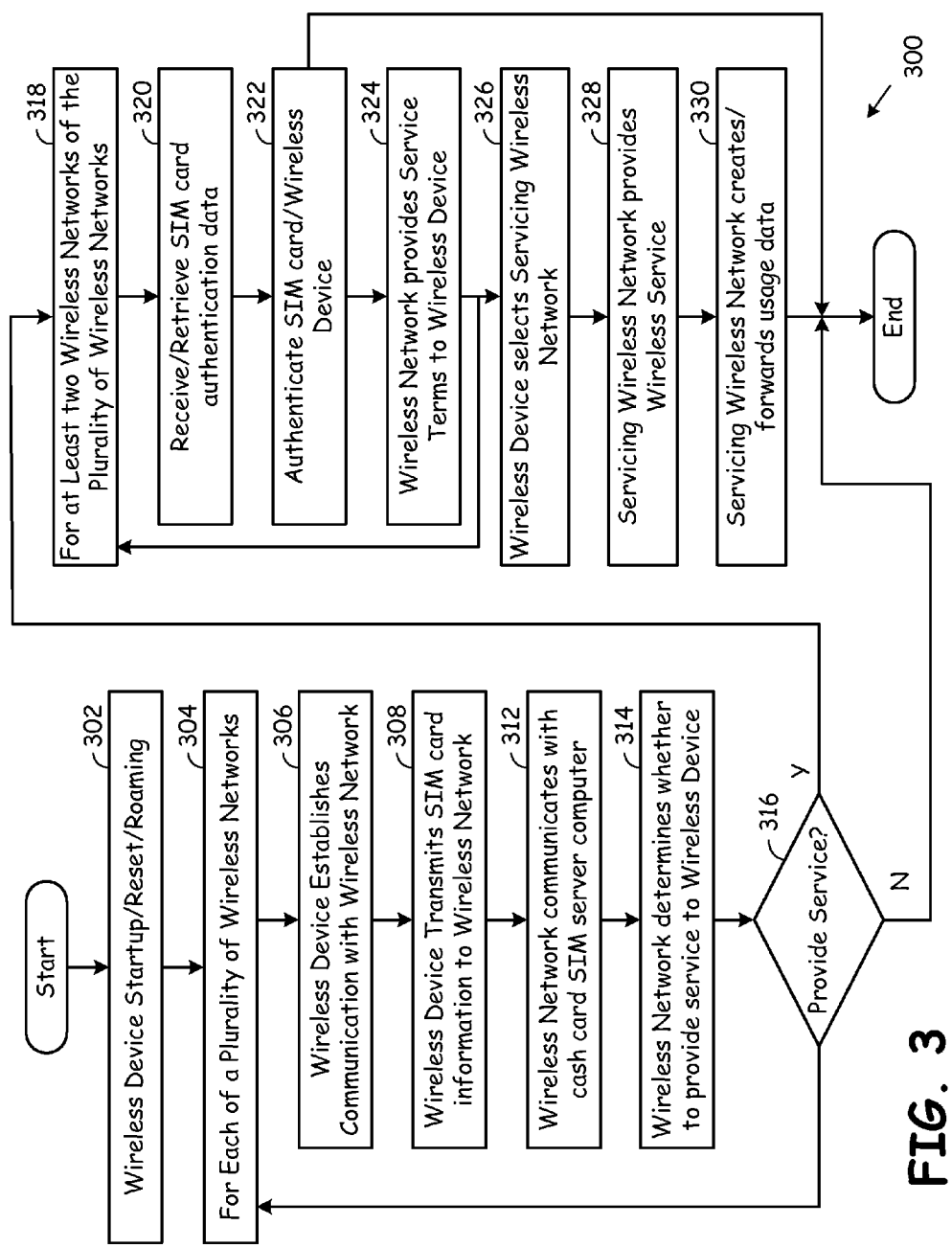
FIG. 3 is a flow chart illustrating generally operation according to one or more embodiments of the present invention.

FIG. 3 is a flow chart illustrating generally operation according to one or more embodiments of the present invention. The operations 300 of FIG. 3 commence with the wireless device initiating a startup operation, reset operation, or in roaming into a servicing coverage area of one or more servicing network(s), e.g., a plurality of wireless networks (Step 302). Then, for each of the plurality of wireless networks the wireless device and the plurality of wireless networks perform a particular set of operations (Step 304).

From Step 304, the wireless device establishes communications with each wireless network of the plurality of wireless networks (Step 306). The wireless device then transmits SIM card information to the wireless network (Step 308). Based upon the transmission of the SIM card information to the wireless network, the wireless network communicates with a cash card SIM server computer that is identified by the wireless device and its SIM card information (Step 312). Via interaction with the cash card SIM server, the wireless network determines whether or not to provide wireless service to the wireless device (Step 314). If the wireless network of the plurality of wireless networks decides not to provide service (as determined at Step 316) operation ends for that particular wireless network.

If the wireless network decides to provide wireless service to the wireless device at Step 316, operation proceeds to Step 318 where the particular wireless network is one of at least two wireless networks of the plurality of wireless networks that may provide wireless service to the wireless device. Steps 320-324 are performed for the at least two wireless networks of the plurality of wireless networks that have a service agreement with the operator of the cash card SIM server. In another embodiment, only a single one of the plurality wireless networks has an operating agreement with the operator of the cash card SIM server.

From Step 318, the particular wireless network receives/retrieves SIM card authentication data for the wireless device from the cash card SIM server (Step 320). The wireless device then authenticates the SIM card/wireless device using the SIM card authentication data (Step 322). Then, the wireless network provides service terms to the wireless device, e.g., cost per minute, cost per data unit, etc. (Step 324). If the SIM card/wireless device cannot be authenticated at Step 322, operation for the particular wireless network ends.

Once the operation for the at least two wireless networks at Step 324 is completed, operation proceeds with the wireless device selecting a servicing wireless network from the wireless networks providing it with service terms (Step 326). The wireless device selects wireless service from one or more potentially servicing wireless network(s) based upon the service terms received at Step 324, for example. The servicing wireless network then provides wireless service to the wireless device (Step 328). When service is completed, or after a particular time period, the servicing wireless network creates and forwards usage data/to the cash card SIM server (Step 330). Usage data may be provided to the cash card server on a periodic basis, e.g., after each five minute usage interval so that the usage of a wireless device may be tracked by both the servicing wireless network and the cash card SIM server. After each usage interval, an appropriate or corresponding debit may be made to the account of the SIM module to indicate that the SIM module has less credit associated therewith.

Figure 4:
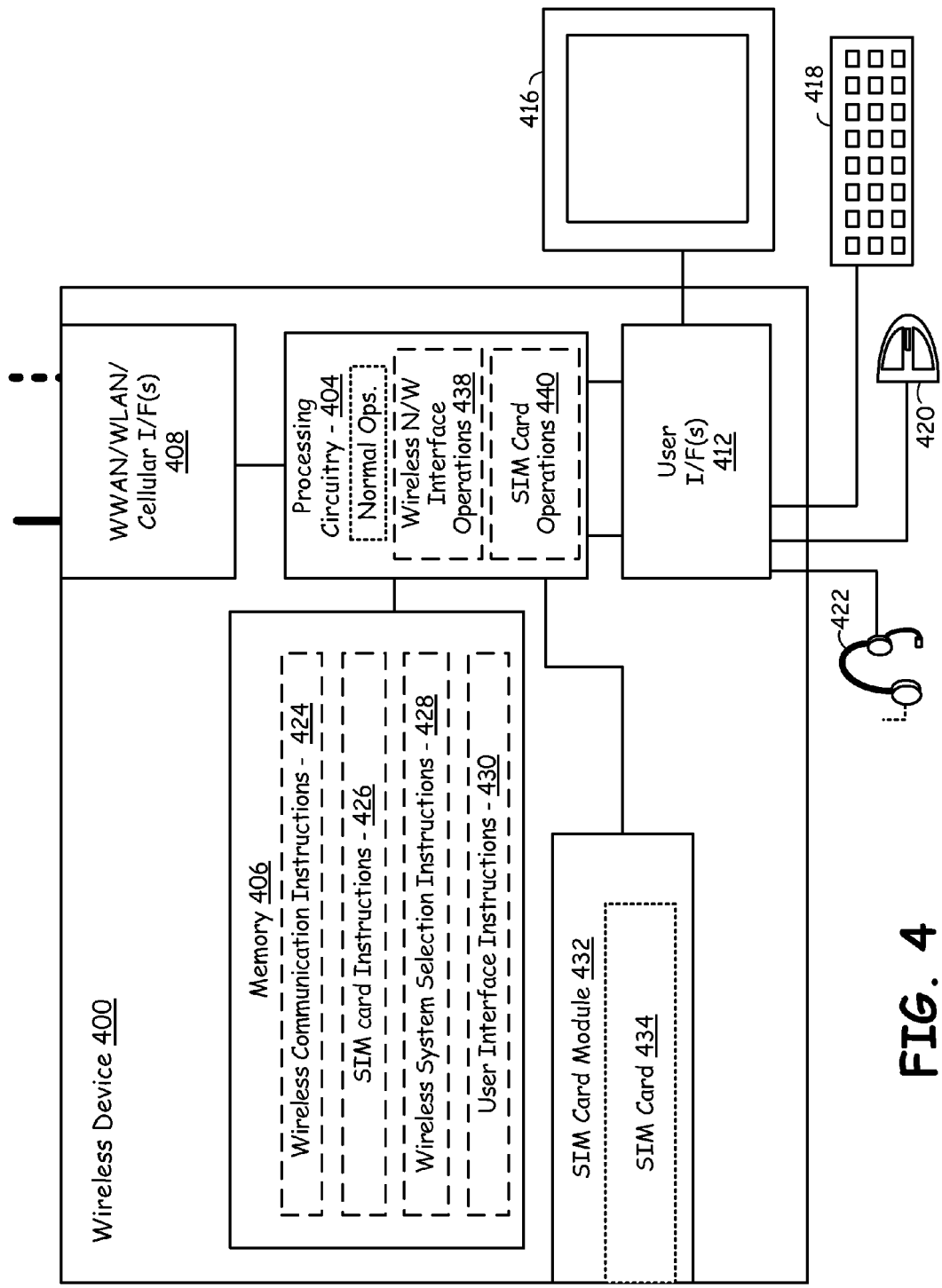
FIG. 4 is a block diagram illustrating a wireless device that supports operations according to one or more embodiments of the present invention.

FIG. 4 is a block diagram illustrating a wireless device that supports operations according to one or more embodiments of the present invention. The wireless device 400 is representative of any of wireless devices 114-138 of FIG. 1 or wireless device 216 of FIG. 2. The wireless device 400 includes processing circuitry 404, memory 406, a wireless interface 408, one or more user interfaces 412, SIM card module 432, and a SIM card 434 engaged into SIM card module 432.

Processing circuitry 404 includes one or more of a microprocessor, a digital signal processor, an Application Specific Integrated Circuit (ASIC), processing logic, dedicated hardware, or other circuitry capable of executing software instructions and processing data to perform the operations of wireless device 400. Processing circuitry 404 performs normal operations and those associated with embodiments of the present invention. The processing circuitry 404 performs wireless network interface operations 438 and SIM card operations 440. These particular operations are consistent with the operations described herein with reference to FIGS. 1, 2, 3, and 6-8. Memory 406 may include random access memory, read-only memory, erasable memory, flash memory, optical memory, magnetic memory, or any other memory capable of storing software instructions and data. User interface(s) 412 couple to headset 422, mouse 420, keyboard 418, and/or display 416. The user interface devices, including headset 422, mouse 420, keyboard 418, and/or display 416 may be integratively formed into a single package with the other components of wireless device 400. SIM card module 432 is constructed and adapted to receive SIM card 434 that is provided by an operator of cash card SIM server 112 and embodiments of the present invention.

The processing circuitry 404 interacts with memory 406 to retrieve software instructions, read data, write data, and/or to perform other memory access operations. In order to support the operations of embodiments of the present invention, memory 406 stores wireless communication instructions 424, SIM card instructions 426, wireless system selection instructions 428, and user interface instructions 430. In combination and perhaps with other information stored in memory and with other operations of the processing circuitry 404, the wireless device 400 is capable of performing the operations described herein with reference to FIGS. 1-3 and 6-8.

Figure 5:
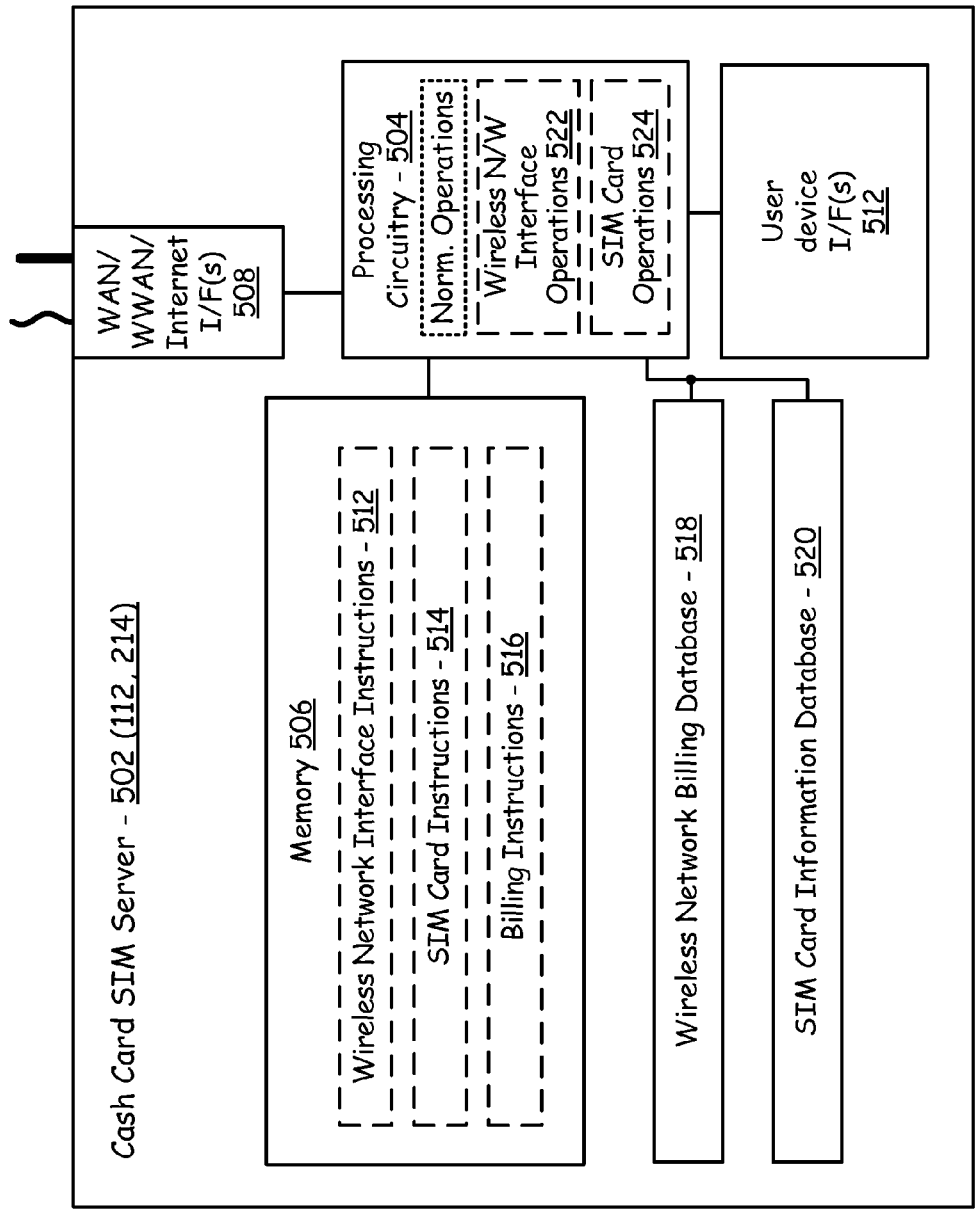
FIG. 5 is a block diagram illustrating a cash card SIM server constructed and operating according to one or more embodiments of the present invention.

FIG. 5 is a block diagram illustrating a cash card SIM server constructed and operating according to one or more embodiments of the present invention. Cash card SIM server 502 may be an embodiment of one or more of cash card SIM server 112 or cash card SIM server 214 of FIGS. 1 and 2, respectively. Cash card SIM server 502 includes processing circuitry 504, memory 506, communication interface 508, user device interface(s) 512, a wireless network billing database 518, and a SIM card information database 520. The processing circuitry 504 may be one or more of a microprocessor, system processor, digital signal processor, an ASIC, custom processing logic, or other electronic circuitry capable of processing instructions and data. The communication interface 508 may include both wired and/or wireless interfaces supporting any of a number of various interface standards. For example, the communication interface 508 may intercouple to a WAN, a WWAN, the Internet, a cellular network, a LAN, a WLAN, or any other communication network that supports interaction between the cash card SIM server 502 and other devices according to embodiments of the present invention.

User device interfaces 512 support user input devices and user output devices, such as display, keyboard, mouse, or any other type of user interface device. Memory 506 may include random access memory, read-only memory, erasable memory, flash memory, optical memory, magnetic memory, or any other memory capable of storing software instructions and data.

The processing circuitry 504 in addition to performing its normal operations performs wireless network interface operations 522 and SIM card operations 524. The operations 522 and 524 are consistent with those previously described with reference to FIGS. 1-3 and with those operates that will be described further herein with reference to FIGS. 6-8. In order to support the operations of processing circuitry 504, processing circuitry 504 may read/write software instructions and/or data from memory 506. The software instructions stored in memory are used by the processing circuitry 504 and include wireless network interface instructions 512, SIM card instructions 514, and billing instructions 516. Upon retrieval and execution of instructions 512, 514, and 516 from memory 506, processing circuitry 504 supports the operations of embodiments of the present invention. Processing circuitry 504 also interacts with wireless network billing database 518 to track wireless network usage and respective billing. Processing circuitry 504 also couples to SIM card information database 520 that is used to store SIM card information regarding subscribers of the operator of cash card SIM server 502.

Figure 6:
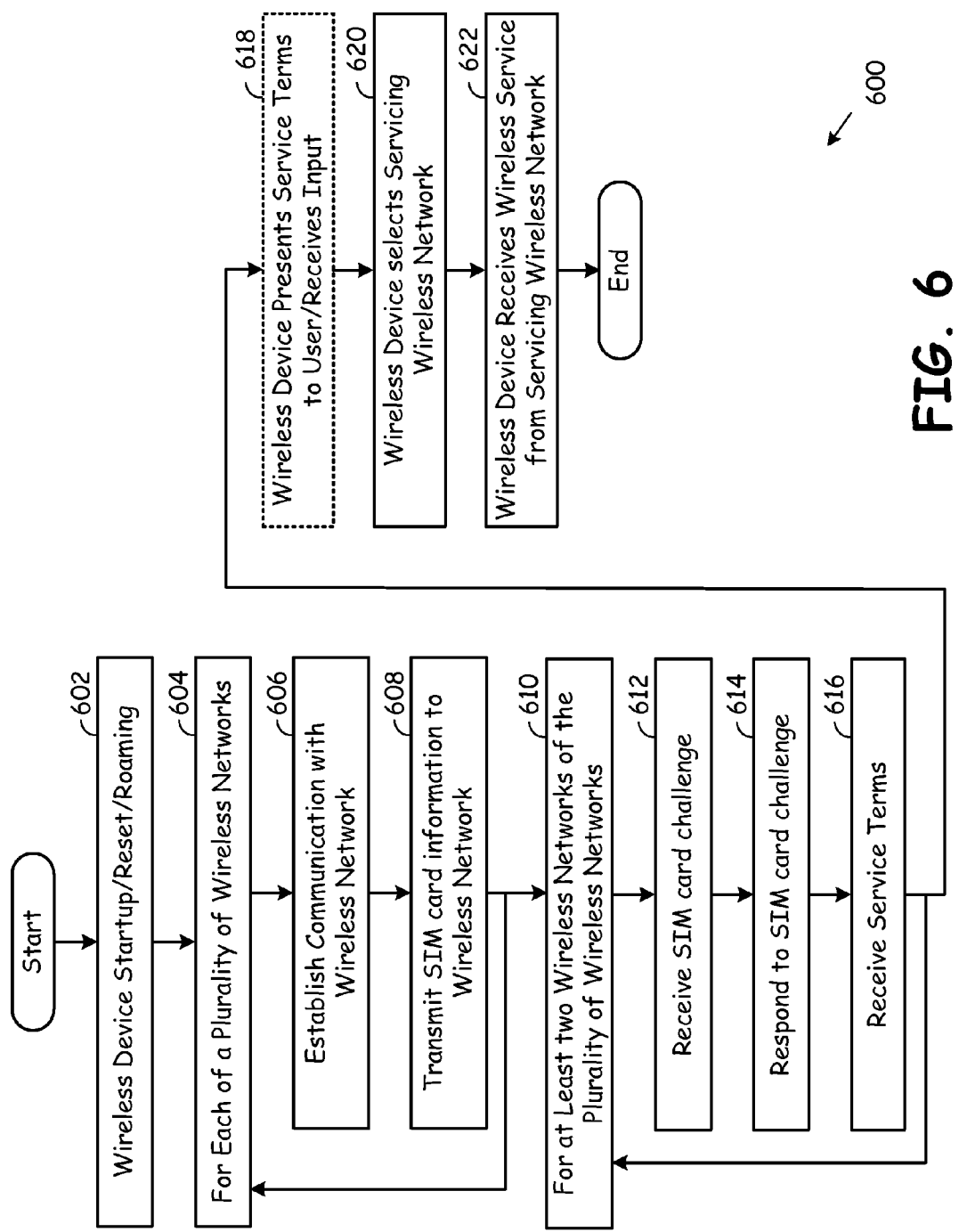
FIG. 6 is a flow chart illustrating operations of a wireless device according to one or more embodiments of the present invention.

FIG. 6 is a flow chart illustrating operations of a wireless device according to one or more embodiments of the present invention. The operations 600 of FIG. 600 commence with the wireless device initiating startup operations, reset operations, roaming operations, and/or other operations with which the wireless device attempts to establish wireless service with a wireless network within range (Step 602). Then, for each of a plurality of networks (Step 604), the wireless device establishes communications with the wireless network (Step 606). Then, for each of the plurality of wireless networks, the wireless device transmits its SIM card information to the wireless network (Step 608).

Then, for at least two wireless networks of the plurality of wireless networks (Step 610), the wireless device receives a SIM card challenge (Step 612). The wireless device then responds to the SIM card challenge based upon information stored in its SIM card and with other stored data, as is required (Step 614). If the response to the SIM card challenge at Step 614 is successful, the wireless device may receive service terms from one or more of the at least two wireless networks of the plurality of wireless networks (Step 616). Next, the wireless device may present service terms received from one or more wireless networks to the user and receive input based upon the service terms (Step 618). Then, based upon the input received from the user or based upon default decisions made by the wireless device, the wireless device selects a servicing wireless network from the at least two wireless networks of the plurality of wireless networks (Step 620). Then, the wireless device receives wireless service from the servicing wireless network (Step 622). From Step 622, operation ends.

Figure 7:
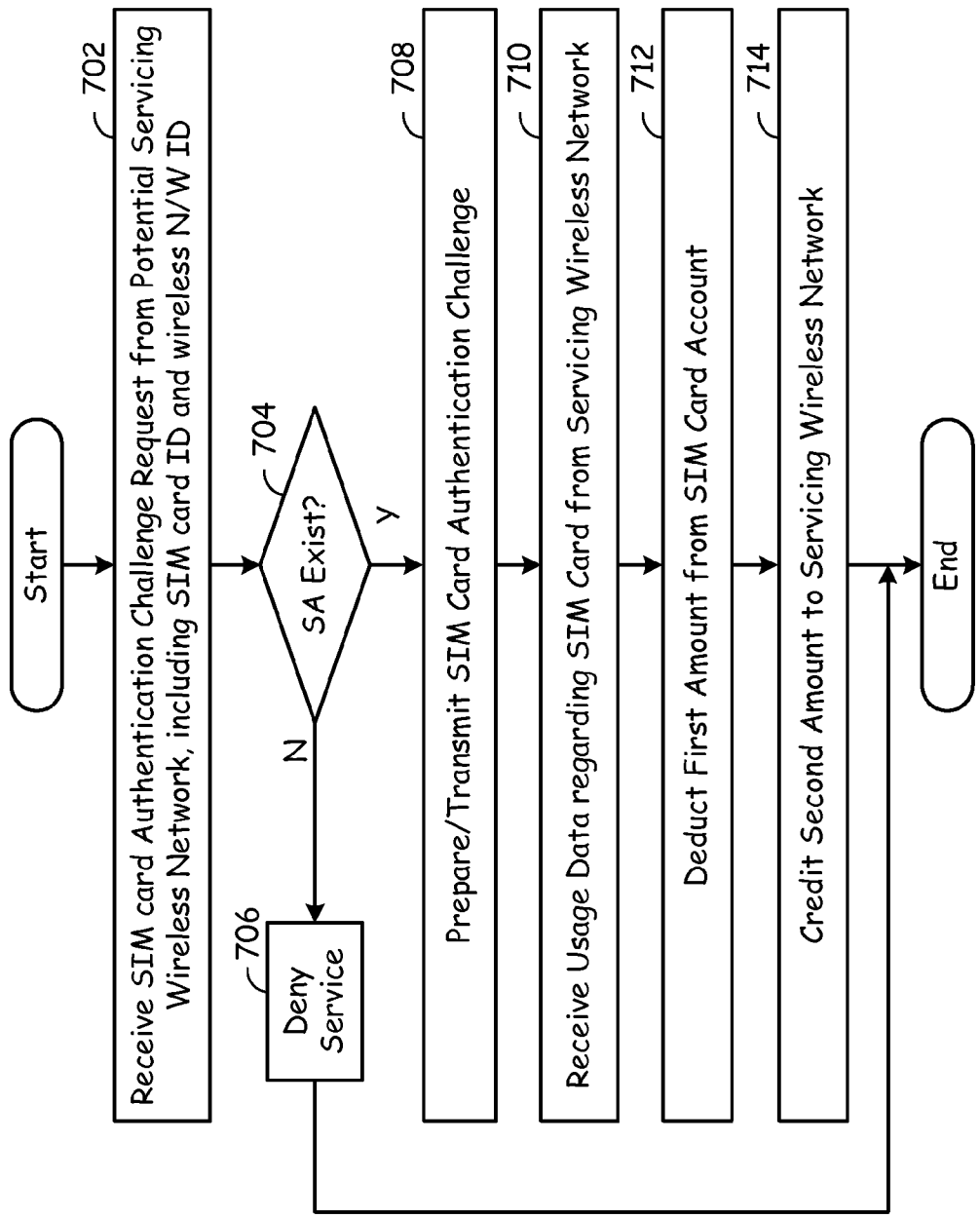
FIG. 7 is a flow chart illustrating operations of a cash card System Interface Module (SIM) server according to one or more embodiments of the present invention.

FIG. 7 is a flow chart illustrating operations of a cash card SIM server according to one or more embodiments of the present invention. With the operations 700 of FIG. 7, the cash card SIM server receives a SIM card authentication challenge request from a potential servicing wireless network (Step 702). The SIM card authentication challenge request includes the ID of a SIM card, an ID of the respective wireless network, and may include additional information. The cash card SIM server then determines whether or not a service agreement exists between the operator of the cash card SIM server and the wireless network sending the request at Step 702 (Step 704). If no service agreement exists with the particular wireless network, the cash card SIM server denies service and may send a message indicating a denial of service to the requesting wireless network (Step 706). Alternately, the cash card SIM server may simply not respond to the requesting wireless network in denying service.

However, if a service agreement does exist between the operator of the cash card SIM server and the requesting wireless network, the cash card SIM computer prepares and transmits a SIM card authentication challenge to the requesting wireless network (Step 708). Assuming that the requesting wireless network does provide wireless service to the wireless device corresponding to the SIM card ID, the cash card SIM server will eventually receive usage data regarding SIM card from the servicing wireless network (Step 710). In response thereto, the cash card SIM server will deduct a first amount from the account of the SIM card based upon the usage data received (Step 712). Then, the cash card SIM server will credit a second amount to the servicing wireless network based upon the usage data (Step 714). The second amount would typically be less than the first amount so that the operator of the cash card SIM server would be able to make money or profit.

Figure 8:
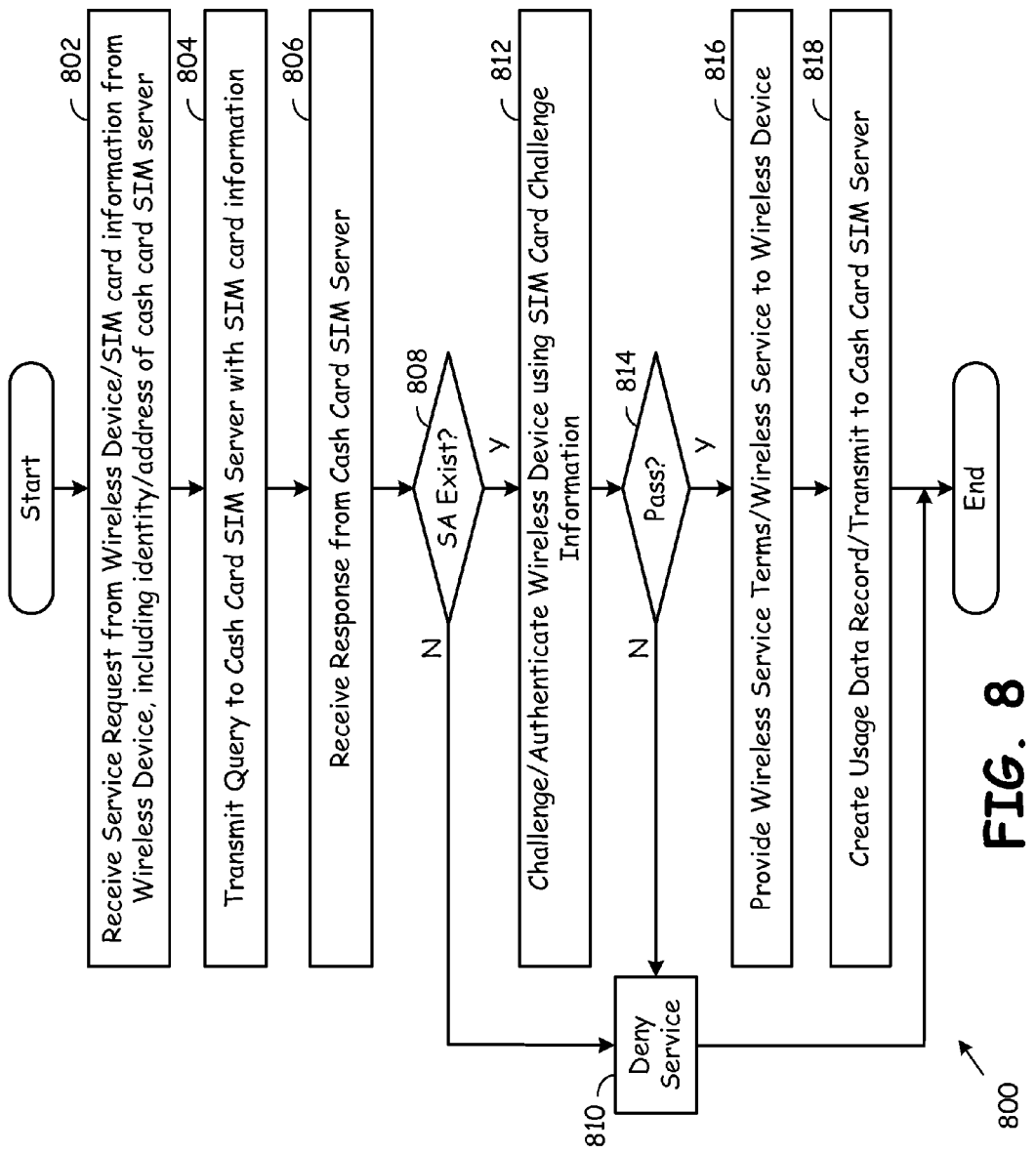
FIG. 8 is a flow chart illustrating operations of a wireless network according to one or more embodiments of the present invention.

FIG. 8 is a flow chart illustrating operations of a wireless network according to one or more embodiments of the present invention. The operations 800 of the wireless network commence with the wireless network receiving a service request from a wireless device (Step 802). The service request includes SIM card information and may also include the identity or address of a corresponding cash card SIM server. Based upon the service request received from the wireless device, the wireless network transmits a query to the cash card SIM server that includes the SIM card information (Step 804). In response to the query, if the cash card SIM server responds, the wireless network receives a response from the cash card SIM server (Step 806). This response may indicate whether or not a service agreement exists between the wireless network and an operator of the cash card SIM server.

If a service agreement does not exist between the operator of the cash card SIM server and the wireless network (as determined at Step 808), the wireless network denies service (Step 810) and operation ends. Alternatively, if a service agreement does exist between the operator of the cash card SIM server and the wireless network (as determined at Step 808), the wireless network challenges or authenticates the wireless device using the SIM card challenge information received at Step 806 (Step 812).

Based upon a response received from the wireless device, the wireless network either determines that the wireless device has passed the SIM card challenge or failed the SIM card challenge at Step 814. If at Step 814, the wireless device fails the SIM card challenge, the wireless network also denies service at Step 814 and 810 and operation ends. If, however, the wireless device does pass the SIM card challenge/authentication operation, the wireless network provides wireless service terms to the wireless device and may also provide wireless service to the wireless device (Step 816). Then, based upon the service provided by the wireless network to the wireless device, the wireless network creates a usage data record and transmits the usage data record to the cash card SIM server (Step 818). Note that while providing service to the wireless device at Step 816, the wireless network at multiple times create usage data records and transmit them to the cash card SIM server at Step 818.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A wireless device comprising:
a wireless communications interface;
a user interface;
a System Interface Module (SIM) card; and
processing circuitry communicatively coupled to the wireless communications interface, the user interface, and to the SIM card, the processing circuitry, in combination with the wireless communications interface, the user interface, and the SIM card operable to:
establish communications with each of a plurality of wireless networks;
transmit SIM card information to the wireless networks;
receive SIM card authentication challenge from at least two of the wireless networks, in which the wireless networks receive a SIM card authentication challenge information from a SIM card server that supports the SIM card, when the wireless networks query the SIM card server in response to the SIM card information transmitted to the wireless networks;
respond to the SIM card authentication challenge;
select a servicing wireless network from the at least two wireless networks based upon correspondingly received wireless service terms; and
receive wireless service from the selected wireless network.

2. The wireless device of claim 1, wherein the wireless service terms comprise respective cost per service unit information for use of respective wireless networks of the at least two wireless networks.

3. The wireless device of claim 1, wherein the SIM card includes an identity of at least one SIM card server.

4. The wireless device of claim 3, wherein the at least one SIM card server supports the wireless device receiving service from one of the at least two wireless networks.

5. The wireless device of claim 1, wherein to select a servicing wireless network from the at least two wireless networks based upon the received wireless service terms, the processing circuitry, in combination with the wireless communications interface, the user interface, and the SIM card to:
present wireless network selection options to a user via the user interface; and
receive a wireless network selection from the user via the user interface.

6. The wireless device of claim 1, wherein to select a servicing wireless network from the at least two wireless networks based upon the received wireless service terms, the processing circuitry, in combination with the wireless communications interface, the user interface, and the SIM card to select a wireless network having lowest priced wireless service terms.

7. A method for operating a wireless device having a wireless communications interface, a user interface, a System Interface Module (SIM) card, and processing circuitry, the method comprising:
establishing communications with a plurality of wireless networks;
transmitting SIM card information to the wireless networks;
receiving SIM card authentication challenge from at least two of the wireless networks, in which the wireless networks receive a SIM card authentication challenge information from a SIM card server that supports the SIM card, when the wireless networks query the SIM card server in response to the SIM card information transmitted to the wireless networks;
responding to the SIM card authentication challenge;
selecting a servicing wireless network from the at least two wireless networks based upon the correspondingly received wireless service terms; and
receiving wireless service from the selected wireless network.

8. The method of claim 7, wherein the wireless service terms comprise respective cost per service unit information for use of respective wireless networks of the at least two wireless networks.

9. The method of claim 7 further comprising accessing the SIM card to identify at least one SIM card server.

10. The method of claim 9, further comprising the at least one SIM card server supporting the wireless device receiving service from one of the at least two wireless networks.

11. The method of claim 7, wherein selecting a servicing wireless network from the at least two wireless networks based upon the received wireless service terms includes:
presenting wireless network selection options to a user via the user interface; and
receiving a wireless network selection from the user via the user interface.

12. The method of claim 7, wherein selecting a servicing wireless network from the at least two wireless networks based upon the received wireless service terms includes selecting a wireless network having lowest priced wireless service terms.

13. A method of operating a System Interface Module (SIM) card server to support wireless network service for a wireless device, the method comprising:
receiving a SIM card authentication challenge request that identifies the SIM card from a wireless network that communicates with the wireless device;
determining whether a service support agreement exists between an operator of the SIM card server and the wireless network;
transmitting SIM card authentication data regarding the SIM card to the wireless network, when a service support agreement exists between the operator of the SIM card server and the wireless network, for the wireless network to challenge the SIM card;

receiving usage data regarding the SIM card from the wireless network; and accounting for the usage data regarding the SIM card.

14. The method of claim 13, wherein the SIM card authentication data regarding the SIM card includes challenge information regarding the SIM card.

15. The method of claim 13, wherein accounting for the usage data regarding the SIM card includes:

deducting a first amount from an account balance of the SIM card based upon the usage data; and crediting a second amount to the servicing network based upon the usage data.

16. The method of claim 13, wherein the second amount is less than the first amount.

17. A System Interface Module (SIM) card server comprising:

a communications interface;

memory; and processing circuitry coupled to the memory and the communications interface to operate with a plurality of wireless networks of differing wireless service providers, the processing circuitry to:

receive a SIM card authentication challenge request from a particular wireless network that identifies a SIM card;

determine whether a service support agreement exists between an operator of the SIM card server and the particular wireless network; and transmit SIM card authentication data regarding the SIM card to the particular wireless network, when a service support agreement exists between the operator of the SIM card server and the particular wireless network, for the particular wireless network to challenge the SIM card;

receive usage data regarding the SIM card from the particular wireless network; and account for the usage data regarding the SIM card.

18. The SIM card server of claim 17, wherein the SIM card authentication data regarding the SIM card includes challenge information to challenge the SIM card.

19. The SIM card server of claim 17, wherein to account for the usage data regarding the SIM card, the processing circuitry to:

deduct a first amount from an account balance of the SIM card based upon the usage data; and credit a second amount to the servicing network based upon the usage data.

20. The method of claim 19, wherein the second amount is less than the first amount.

21. A method of operating a wireless network to provide wireless service to a wireless device comprising:

receiving a service request from the wireless device;

receiving System Interface Module (SIM) card information from the wireless device, the SIM card information including an identity of a SIM card server;

transmitting a SIM card authentication information request to the SIM card server;

receiving SIM card authentication challenge information from the cash card SIM server, when a service support agreement exists between an operator of the SIM card server and the wireless network;

transmitting a SIM card challenge to the wireless device;

receiving a SIM card challenge response from the wireless device;

providing wireless service to the wireless device, when the SIM card challenge response is authentic;

creating usage data pertaining to service provided to the wireless device; and transmitting the usage data to the SIM card server.

* * * * *